United States Patent [19]
Kohmura et al.

[11] 3,859,112
[45] Jan. 7, 1975

[54] WATER RESISTANT HEATSENSITIVE RECORDING COMPOSITION CONTAINING AN ETHYLENEIMINE HARDENER

[75] Inventors: Isao Kohmura; Kiyoshi Futaki, both of Kyoto, Japan

[73] Assignee: Mitsubishi Paper Mills, Ltd., Tokyo, Japan

[22] Filed: July 6, 1973

[21] Appl. No.: 377,015

[30] Foreign Application Priority Data
July 20, 1972 Japan.......................... 47-72008

[52] U.S. Cl............ 117/36.8, 96/114.1, 106/288 Q, 106/308 Q, 106/308 N, 106/308 C, 106/308 M, 117/36.7, 260/8, 260/14, 260/38, 260/29.3, 260/29.6 E, 260/29.6 ME, 260/29.6 NR, 260/29.6 BE
[51] Int. Cl............................................. B41m 5/18
[58] Field of Search............. 260/14, 29.3, 29.6 E, 260/29.6 ME, 29.6 NR, 29.6 BE; 117/36.8, 36.7

[56] References Cited
UNITED STATES PATENTS

| | | | |
|---|---|---|---|
| 2,933,416 | 4/1960 | Haakh............................ | 260/29.6 E |
| 2,961,349 | 11/1960 | Bartl................................ | 260/29.3 |
| 3,028,254 | 3/1962 | Grant............................... | 117/36.8 |
| 3,090,697 | 5/1963 | Lawton et al..................... | 117/36.7 |
| 3,219,470 | 11/1965 | Lassig.............................. | 117/36.8 |
| 3,316,202 | 4/1967 | Abere.............................. | 260/29.7 |
| 3,351,008 | 11/1967 | Lincoln et al..................... | 101/465 |
| 3,427,180 | 2/1969 | Phillips............................ | 117/36.2 |
| 3,459,128 | 8/1969 | Erdmann......................... | 260/14 |

*Primary Examiner*—Melvin Goldstein
*Assistant Examiner*—Edward Woodberry
*Attorney, Agent, or Firm*—Cushman, Darby & Cushman

[57] ABSTRACT

Water resistance, coagulation stability (dispersibility) and texture of heat-sensitive recording material which comprises a normally colorless or pale-colored chromogenic compound capable of forming a color by reaction with an organic acidic compound at an elevated temperature, said organic acidic compound and a water-soluble binder can be improved by adding thereto a hardener for said binder. Said hardener is a compound having 2 to 10 ethyleneimine groups

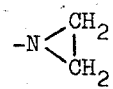

11 Claims, No Drawings

WATER RESISTANT HEATSENSITIVE RECORDING COMPOSITION CONTAINING AN ETHYLENEIMINE HARDENER

BACKGROUND OF THE INVENTION

This invention relates to an aqueous dispersion type composition for heat-sensitive recording material which comprises a normally colorless or pale-colored chromogenic compound capable of forming a color by reaction with an organic acidic compound at an elevated temperature, the said organic acidic compound, a water-soluble compound (binder) and a hardener having 2 to 10 ethyleneimine groups for said binder, which composition is particularly excellent in water resistance, coagulation stability (dispersibility) and texture due to the use of a specific compound as said hardener, and to a heat-sensitive recording sheet using the said composition.

Heretofore, this kind of composition for heat-sensitive materials such as, for example, the aqueous dispersion type compositions for heat-sensitive recording materials which are disclosed in Japanese Patent Publication Nos. 7,930/69 and 14,039/70 have been prepared by use of polyvinyl alcohol, methyl cellulose, hydroxyethyl cellulose, gum arabic, gelatin and styrene-maleic anhydride copolymer, though this is a matter of course. Due to contact with water or moisture, therefore, the surfaces of materials coated with such heat-sensitive recording compositions are flowed or stained, images formed thereon are deteriorated, or paper- or sheet-like recording materials coated with said compositions become brittle on the whole. Thus, the above-mentioned compositions have been low in practical usability. For the above reasons, the surfaces coated with said heat-sensitive recording compositions are required to be made water resistant. In this case, it is naturally thought out to use, in connection with the aforesaid water-soluble high molecular compounds, such crosslinking type hardeners as formaline, glyoxal, chromium alum and melamine-formaldehyde resin. When applied to heat-sensitive recording materials of such a type as in the present invention, however, the above-mentioned hardeners sometimes bring about such drawbacks as to cause the coagulation of coating liquids of heat-sensitive recording compositions at the time of preparation, disturb the coloration of heat-sensitive compositions fade the colors of colored images, or stain the textures at other portions than colored portions. Particularly when water-soluble high molecular compounds containing carboxyl or hydroxyl groups are used as the binders in the present invention, it is a novel subject matter to overcome the above-mentioned drawbacks of the heat-sensitive recording compositions to such an extent that the compositions are practically usable, in addition to impart high water resistance to the compositions.

In view of the above-mentioned subject matter, the present inventors thought out to incorporate into a heat-sensitive recording composition the combination of a water-soluble high molecular compound with a hardener having 2 to 10 ethyleneimine groups for said high molecular compound. On the basis of the above idea, the inventors have been successful in preparing a composition for aqueous dispersion type heat-sensitive recording material high in practical usability by using a specific hardener in combination with a water-soluble molecular compound.

SUMMARY OF THE INVENTION

An object of the present invention is to provide a composition for heat-sensitive recording material or sheet excellent in water resistance.

Another object of the invention is to provide a heat-sensitive recording composition which is high in processability, i.e., excellent in dispersibility and difficultly agglomerating, at the time of preparation of a coating liquid of said composition.

A further object of the invention is to provide a heat-sensitive recording material containing the abovementioned composition which is beautiful in texture of other portions than colored portions and thus is high in commodity value.

DESCRIPTION OF THE PREFERRED EMBODIMENTS

The individual components used in the present invention are explained below.

As the organic acidic compound which substantially constitutes the heat-sensitive recording element of the present invention, there may be used any of such compounds as shown below, though these are not limitative.

m-Cresol
Catechol
4,4'-Isopropylidene diphenol
4,4'-Isopropylidenebis(2-chlorophenol)
4,4'-Isopropylidenebis(tert-butylphenol)
4,4'-sec-Butylidene diphenol
4-Phenylphenol
4-Hydroxydiphenoxide
Methyl-4-hydroxybenzoate
Phenyl-4-hydroxybenzoate
4-Hydroxyacetophenone
Salicylanilide
Novolak type phenol resin
Halogenated novolak type phenol resin
$\alpha$-Naphthol
$\beta$-Naphthol
p,p'-(1-Methyl-n-hexylidene)diphenol If necessary, these may be used in combination of 2 or more to lower the melting point of the composition. Particularly preferable organic acidic compounds are diphenol compounds having 2 hydroxy groups in one molecule.

As the normally colorless or pale-colored chromogenic compound capable of forming a color by reaction with the organic acidic compound at an elevated temperature, there may be used any such compounds as shown below, though these are not limitative.

Crystal Violet Lactone
Malachite Green Lactone
3,3-Bis(p-dimethylaminophenyl)-4,5,6,7-tetrachlorophthalide
Benzo-$\beta$-naphthospiropyran
3-Methyl-di-$\beta$-naphthospiropyran
1,3,3-Trimethyl-6'-chloro- 8'-methoxyindolinobenzospiropyran
Diethylamino-(N-methylanilino)fluoran
3-Dimethylamino-6-methoxyfluoran
3-Dibutylamino-6-methyl-7-chlorofluoran
3-Morpholino-5,6-benzofluoran
6'-Chloro-8'-methoxyindolino-benzospiropyran
Benzyl Leuco Methylene Blue
1-Amino-3,6,7-trimethylfluoran These may be used in combination of 2 or more in the form of single or double layers to obtain a different-colored or multicolored image.

As the water-soluble high molecular compound to be used in the heat-sensitive recording element, a carboxyl or hydroxy group-containing compound is particularly preferable. Examples thereof include hydroxyethyl cellulose, polyvinyl alcohol, styrene-maleic anhydride copolymers, methyl vinyl ether-maleic anhydride copolymers, styrenephthalic anhydride copolymers, carboxymethyl cellulose, gum arabic, gelatin, casein, vinyl acetate-crotonic acid copolymers, acrylamide-acrylic acid copolymers, partially succinated polyvinyl alcohol, N,N'-dimethylmaleamic acid-methacrylic acid dimethylamide copolymers and vinyl acetate-maleic acid copolymers, though these are not limitative. Particularly, the combination of styrene-maleic anhydride copolymer with hydroxyethyl cellulose is preferable as a typical example which is practically and economically stable.

As the hardener, a compound having 2 to 10 ethyleneimine groups is used in connection with the abovementioned water-soluble high molecular compound and heat-sensitive recording element. That is, when a compound having 2 to 10 ethyleneimine groups

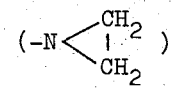

is used as the hardener, the coating liquid is so stable as to cause no agglomeration or no viscosity increase even when allowed to stand for one day and is scarely colored. When the coating liquid is coated on a support and dried, the resulting coating sheet shows a high water resistance and is not peeled off or stained even when wetted with water and then rubbed with a finger. Further, the degree of coloration in texture of the recording sheet can be made lower by addition of the above-mentioned compound having ethyleneimine groups. Thus, the said compound has a great effect on the prevention of the recording sheet from coloration in texture as well.

Typical examples of the compounds having 2 to 10 ethyleneimine groups are as shown in Table 1, though these are not limitative.

Table 1 a) 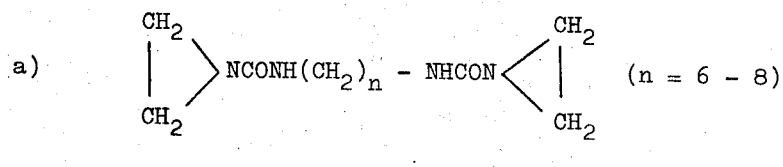

b) 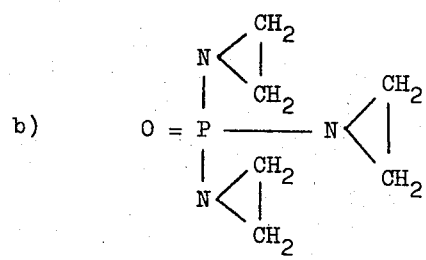

c) 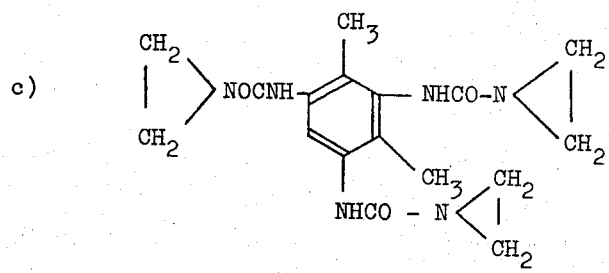

d) 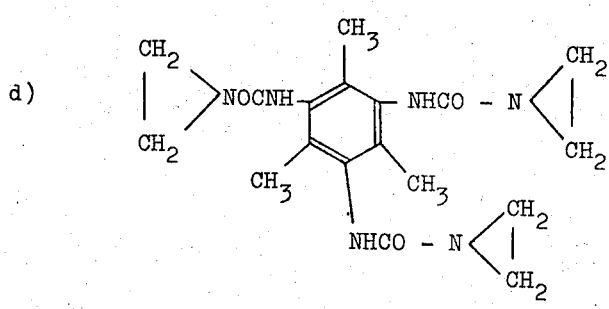

e) 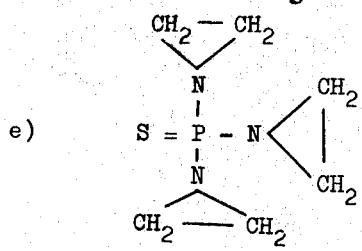

k) 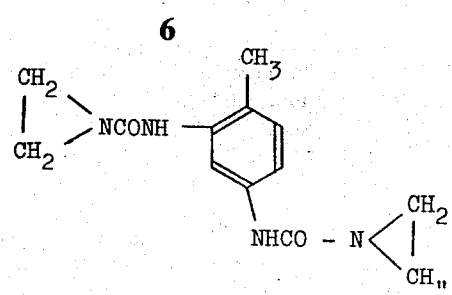

f) 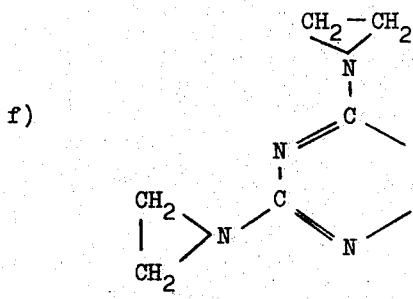

Blending proportions of the above-mentioned components vary depending on the kinds of the heat-sensitive recording composition, the water-soluble high molecular compound, the hardener, etc., but are preferably within such ranges as set forth below.

| (1) | Organic acidic compound | 40–95 % | by weight |
|---|---|---|---|
| (2) | Chromogenic compound | 1–15 % | do. |
| (3) | Water-soluble high molecular compound | 5–45 % | do. |
| (4) | Hardener | 0.1–30 % by weight, preferably 0.5–20 % by weight, based on the weight of (3) | | g)

h)

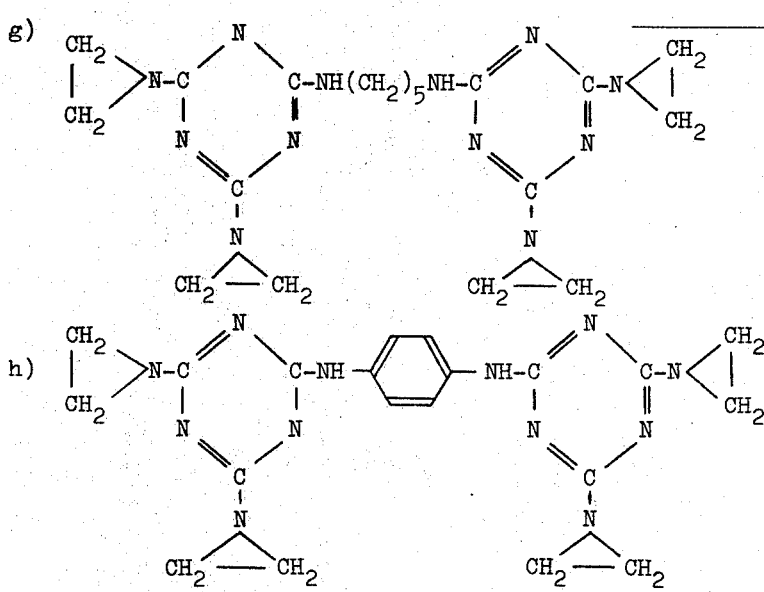

i)

j)

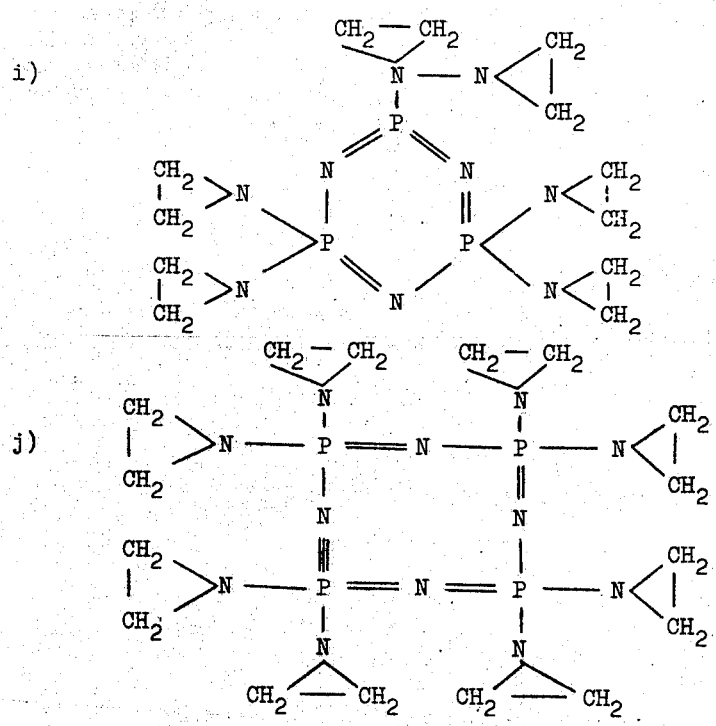

The above-mentioned components are formed into an aqueous dispersion, which is then coated on such support as paper, film, resin-coated paper (RC paper) or metal-deposited paper.

Procedures for preparing the heat-sensitive recording composition of the present invention are explained below.

A mixture of the chromogenic compound and the organic acidic compound is sufficiently kneaded together with the water-soluble high molecular compound and, if necessary, an aqueous dispersant. In this case, it is preferable to control the particle size of the heat-sensitive recording element to less than several microns. The kneading operation is ordinarily carried out in a ball mill, if necessary, in the presence of a defoaming agent (silicon or wax) or the like surface active agent as a pulverization adjuvant.

At the time of preparing a coating liquid of the heat-sensitive recording element, such components as mentioned below may preferably be added. That is, $TiO_2$, ZnO, lithopone, clay, magnesia, talc or the like may be added in order to enhance the whiteness of the recording sheet or to prevent the staining of thermal head or the like; starch, wax, polyolefin or polyalkylsiloxane may be added in order to prevent the recording sheet from coloration due to pressure; or a weakly basic substance, e.g., an inorganic alkali salt such as $CaCO_3$, $MgCO_3$ or $Na_2CO_3$, or an amine compound such as triethanolamine, dodecyltrimethyl ammonium chloride, 3-amino-2-hexanol or dodecylamine acetate, may be added in order to prevent the coloration in texture of the recording sheet.

The present invention is illustrated in detail below with reference to examples.

EXAMPLE 1

| Liquid A: | | |
|---|---|---|
| | Crystal Violet Lactone | 1 g. |
| | 20 % Aqueous styrene-maleic anhydride copolymer solution (trade name "Malon MS" produced by Daido Kogyo K.K.) | 1 g. |
| | Water | 4 g. |
| Liquid B: | | |
| | 4,4'-Isopropylidene diphenol | 6 g. |
| | 20 % Aqueous styrene-maleic anhydride solution | 6 g. |
| | Water | 24 g. |

The above-mentioned liquids A and B were individually pulverized in a ball mill for 2 days, and then mixed with each other. The mixed liquid was sufficiently mixed with 0.7 g. of a 10 percent aqueous solution of the compound (a) ($n = 6$) shown in Table 1 to form a coating liquid. This coating liquid was coated on an ordinary paper having a basis weight of 50 g/m², so that the amount of the liquid after drying became 3 g/m², to obtain a heat-sensitive recording sheet.

For comparison, heat-sensitive recording sheets were prepared in the same manner as above, except that any of the hardeners shown in Table 2 was used in place of the compound (a).

Properties of these heat-sensitive recording materials were as set forth in Table 2.

As is clear from Table 2, the coating liquid containing potassium alum or chromium alum is so agglomerated as not to be coatable, and formalin and glyoxal cannot give water-resistant coatings. In contrast to this, the coating liquid containing the compound (a) according to the present invention is not agglomerated and can give a coating which is sufficiently water-resistant and is not stained or peeled off even when wetted with water and then rubbed with a finger. Further, the texture of the recording sheet containing the compound (a) is whiter than that of a recording sheet containing no hardener, and thus the compound (a) is high in effect of preventing the coloration in texture of the recording sheet, as well.

Table 2

| | Hardener | Agglomeration of coating liquid | Water resistance | Texture coloration | Remarks |
|---|---|---|---|---|---|
| 1 | No hardener used | None | Low | More or less | Control |
| 2 | Compound (a) | None | High | None | Present invention |
| 3 | Formalin | None | Low | More or less | Control |
| 4 | Glyoxal | None | Low | Marked | do. |
| 5 | Potassium alum | Observed | Untestable | Untestable | do. |
| 6 | Chromium alum | do. | do. | do. | do. |
| 7 | Melamine-formalin resin (trade name "Sumirez Resin 613" produced by Sumitomo Kagaku Kogyo K.K.) | More or less | Low | Marked | do. |
| 8 | Polyethylene oxide (trade name "Alkox E-30" produced by Meisei Kagaku K.K.) | None | Medium | Marked | do. |
| 9 | Alkylketone dimer (trade name "Newpel No. 2200" produced by Arakawa Rinsan K.K.) | None | Low | Marked | do. |

EXAMPLE 2

A heat-sensitive recording sheet was prepared in the same manner as in Example 1, except that polyvinyl alcohol (trade name "Gosenol NH-20" produced by Nippon Gosei Kagaku K.K.) was used in place of the styrene-maleic anhydride copolymer and the compound (b) shown in Table 1 was used as the hardener in place of the compound (a). This recording sheet was also high in water resistance and less in texture coloration.

EXAMPLE 3

A heat-sensitive recording sheet was prepared in the same manner as in Example 1, except that 3-diethylamino-7-chlorofluoran was used in place of the Crystal Violet Lactone, hydroxyethyl cellulose (trade name "HEC BL-15" produced by Fuji Chemical K.K.) was used in place of the styrene-maleic anhydride copolymer, and the compound (f) shown in Table 1 was used in place of the compound (a). This recording sheet was less in texture coloration and high in water resistance, and gave an excellent red image.

EXAMPLE 4

| Liquid A: | | |
|---|---|---|
| | 3-Diethylamino-7-(N-methyl-p-toluidino)fluoran | 1 g. |
| | 5 % Aqueous hydroxyethyl cellulose solution | 4 g. |
| | 20 % Aqueous styrene-maleic anhydride copolymer solution | 3.75 g. |
| | Water | 2.2 g. |

| Liquid B: | | | |
|---|---|---|---|
| | 4,4'-Isopropylidene diphenol | 5 | g. |
| | 5 % Aqueous solution of hydroxyethylcellulose | 20 | g. |
| | 20 % Aqueous solution of styrene-maleic anhydride copolymer | 18.75 | g. |
| | Water | 11 | g. |

The above-mentioned liquids A and B were individually pulverized in the same manner as in Example 1 and then mixed with each other. The mixed liquid was sufficiently mixed with 20 g. of a 50 percent flour starch dispersion, 5 g. of a 20 percent wax emulsion (trade name "Repol No. 50" produced by Daikyo Kagaku K.K.) and 14 g. of a 10 percent aqueous solution of the compound (a) ($n = 8$) shown in Table 1 to form a heat-sensitive coating liquid. This coating liquid was coated on an ordinary paper having a basis weight of 50 g/m$^2$, so that the amount of the coated liquid after drying became about 5.5 g/m$^2$, to obtain a heat-sensitive recording sheet. This recording sheet was sufficiently high in water resistance, and the coating formed thereon was not peeled off or stained even when wetted with water and then rubbed with a finger. Further, the recording sheet was extremely less in texture coloration and thus was high in effect of prevention of texture coloration, and gave a brilliant green image.

EXAMPLE 5

| Liquid A: | | | |
|---|---|---|---|
| | 3-Diethylamino-7-chlorofluoran | 1 | g. |
| | 20 % Aqueous vinyl acetate-crotonic acid copolymer solution | 1 | g. |
| | Water | 4 | g. |
| Liquid B: | | | |
| | 4,4'-Isopropylidene diphenol | 6 | g. |
| | 20 % Aqueous vinyl acetate-crotonic acid copolymer solution | 6 | g. |
| | Water | 24 | g. |

Using the above-mentioned liquids A and B, a heat-sensitive recording sheet was prepared in the same manner as in Example 1, except that 0.7 cc. of a 10 percent aqueous solution of the compound (f) shown in Table 1 was used as the hardener. This recording sheet was identical in properties with the recording sheet obtained in Example 1.

EXAMPLE 6

| Liquid A: | | | |
|---|---|---|---|
| | 3-Methyl-di-β-naphthospiropyran | 1 | g. |
| | 5 % Aqueous gum arabic solution | 20 | g. |
| | Water | 20 | g. |
| Liquid B: | | | |
| | 4,4'-Cyclohexylidene diphenol | 5 | g. |
| | 5 % Aqueous gum arabic solution | 120 | g. |
| | Water | 30 | g. |
| Liquid C: | | | |
| | 20 % Polyethylene emulsion | 10 | g. |
| Liquid D: | | | |
| | Acetyl starch | 15 | g. |
| | Water | 15 | g. |
| Liquid E: | | | |
| | 10 % Aqueous solution of the compound (b) shown in Table 1 | 14 | g. |

The above-mentioned liquids A, B, C, D and E were mixed together, and the mixed liquid was coated on a polyethylene-coated paper having a basis weight of 50 g/m$^2$, so that the amount of the coated liquid after drying became 5 g/m$^2$, to obtain a heat-sensitive recording sheet which was markedly excellent in water resistance and was resistant to coloration due to pressure and to texture coloration.

What is claimed is:

1. An aqueous dispersion composition for heatsensitive recording material which comprises a normally colorless or pale-colored chromogenic compound capable of forming a color by reaction with a phenol at an elevated temperature, the said phenol, a water-soluble binder, and a hardener having 2 to 10 ethyleneimine groups for the said binder.

2. A composition according to claim 1, wherein the water soluble binder is a water-soluble high molecular weight compound having carboxyl or hydroxyl groups.

3. A composition according to claim 2, wherein the water-soluble binder is a styrene-maleic anhydride copolymer or a mixture thereof with hydroxyethyl cellulose.

4. A composition according to claim 2, wherein the chromogenic compound is selected from the group consisting of:
   Crystal Violet Lactone
   Malachite Green Lactone,
   3,3-bis(p-Dimethylaminophenyl)-4,5,6,7-tetrachlorophthalide,
   Benzo-β-naphthospiropyran,
   3-Methyl-di-β-naphthospiropyran,
   1,3,3-trimethyl-6'-chloro-8'-methoxyindolino benzospiropyran,
   Diethylamino-(N-methylanilino)fluoran,
   3-Dimethylamino-6-methoxyfluoran,
   3-Dibutylamino-6-methyl-7-chlorofluoran,
   3-Morpholino-5,6-benzofluoran,
   6'-chloro-8'-methoxyindolino-benzospiropyran,
   Benzyl Leuco Methylene Blue and
   1-Amino-3,6,7-trimethylfluoran.

5. A composition according to claim 2, wherein the phenol is selected from the group consisting of metracresol, catechol, 4,4'-isopropylidenediphenol, 4,4'-isopropylidenebis(2-chlorophenol), 4,4'-isopropylidenebis(tert-butylphenol), 4,4'-sec-butylidene diphenol, 4-phenylphenol, 4-hydroxydiphenoxide, methyl-4-hydroxybenzoate, phenyl-4-hydroxybenzoate, 4-hydroxyacetophenone, salicyclic acid anilide, novolak phenol resin. halogenated novolak phenol resin, α-naphthol, β-naphthol and p,p'-(1-methyl-n-hexylidene)diphenol.

6. A composition according to claim 3, wherein the hardener is selected from the group consisting of a) 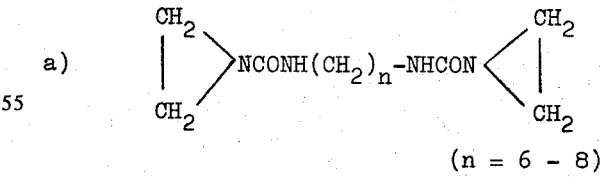

$(n = 6 - 8)$ b) 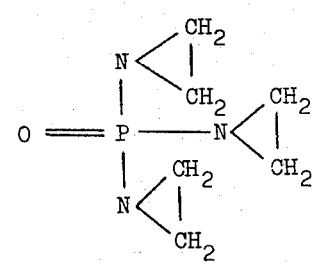

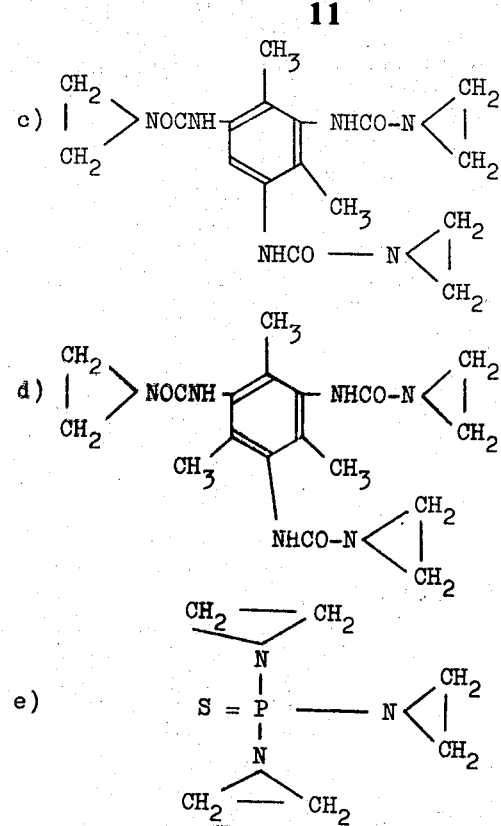
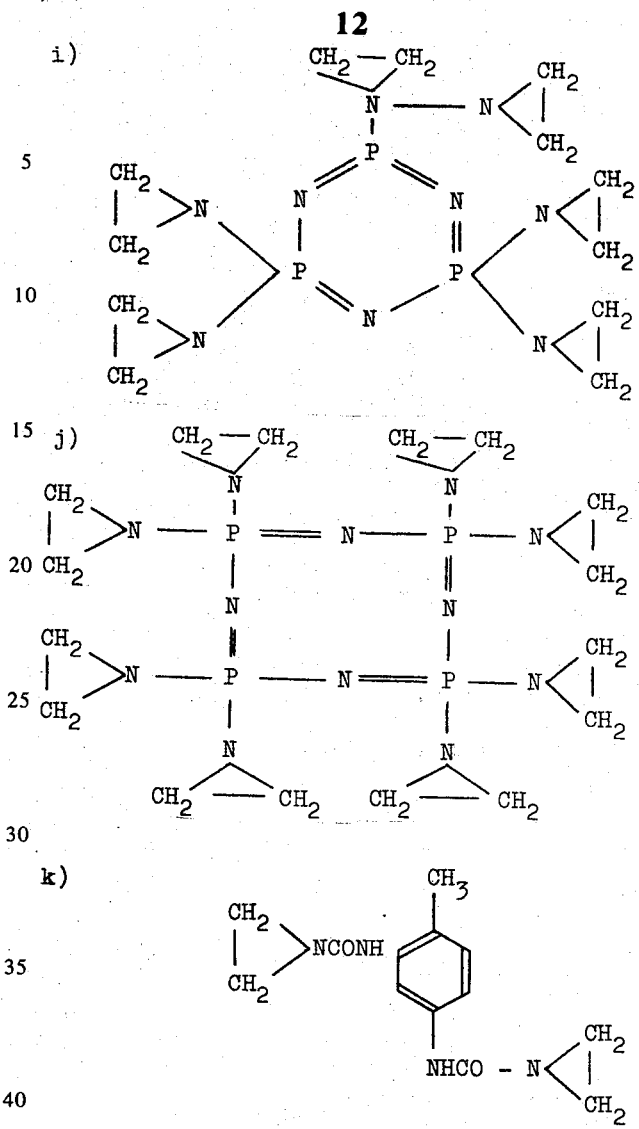
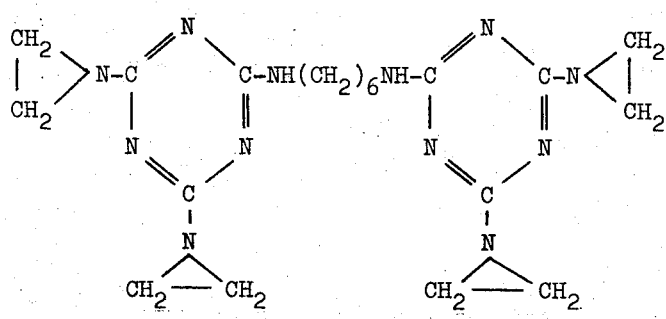
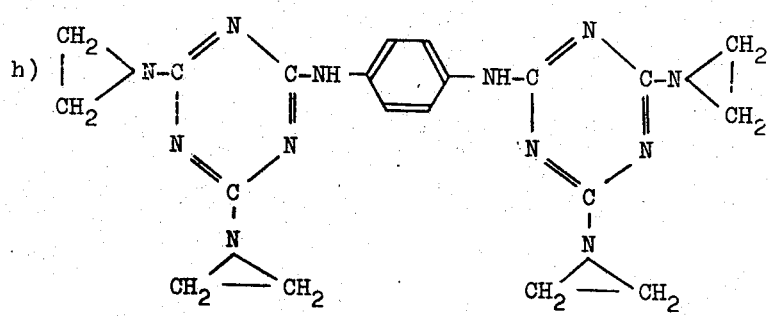

7. A composition according to claim 2, wherein the water soluble binder is selected from the group consisting of hydroxyethyl cellulose, polyvinyl alcohol, styrene-maleic anhydride copolymer, methyl vinyl ether-maleic anhydride copolymer, styrene-phthalic anhydride copolymer, carboxymethyl cellulose, gum arabic, gelatin, casein, vinyl acetate-crotonic acid copolymer, acrylamide-acrylic acid copolymer partially succinated polyvinyl alcohol, N,N'-dimethylmaleamic acid-methacrylic acid dimethylamide copolymer and vinyl acetatemaleic acid copolymer.

8. A composition according to claim 2, wherein the hardener is selected from the group consisting of a) 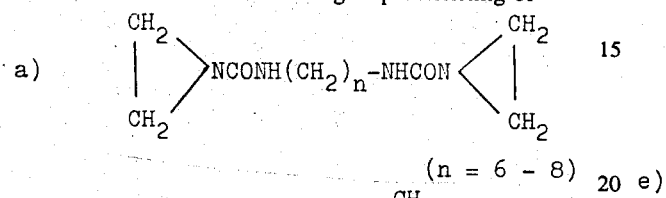

(n = 6 - 8)

b) 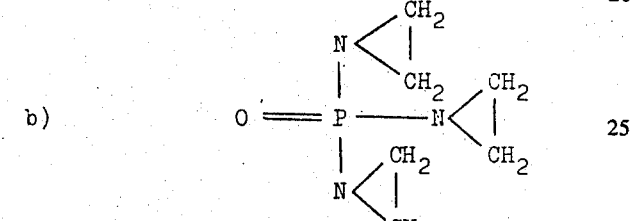

c) 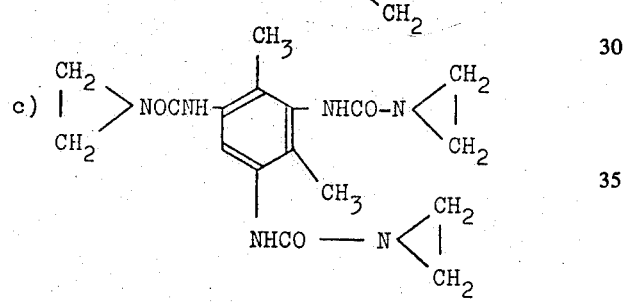

d) 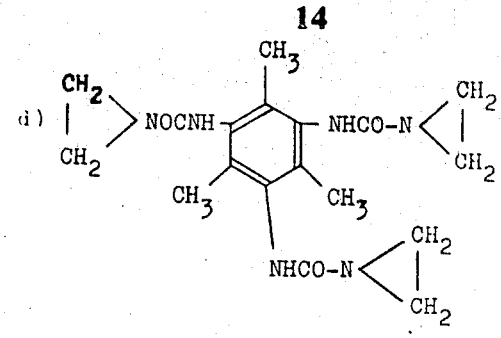

e) 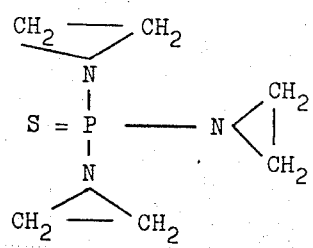

f) 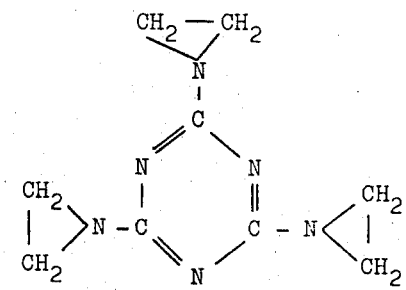

g) 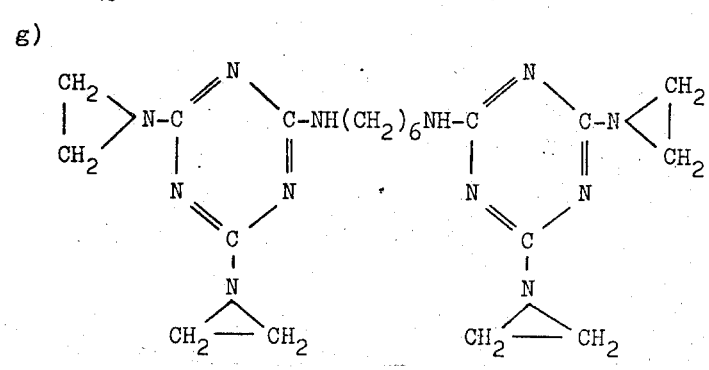

h) 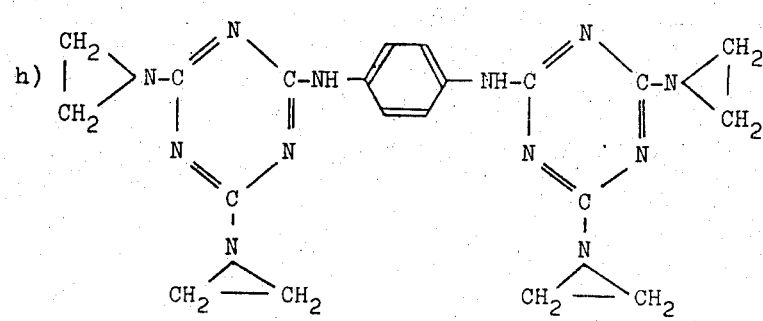

i) 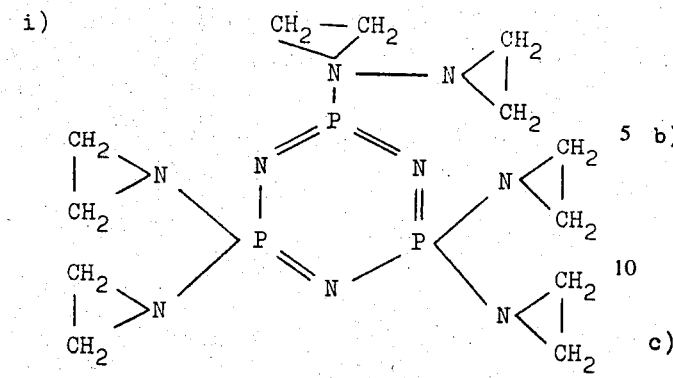
b) 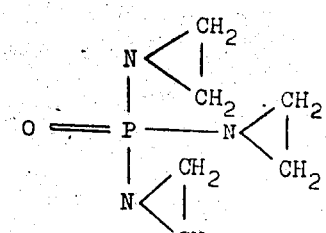
c) 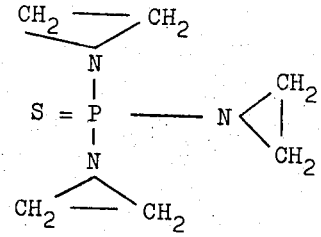
j) 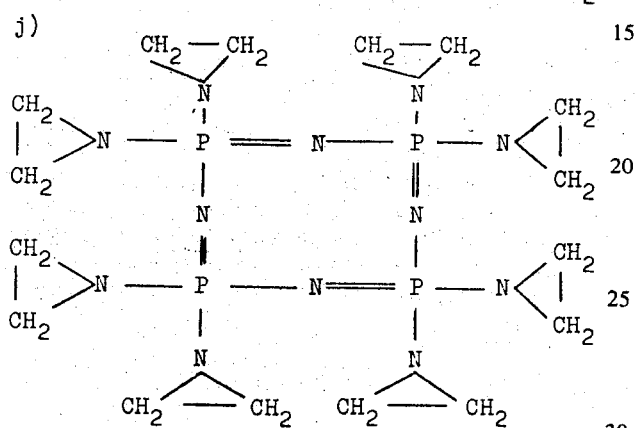
d) 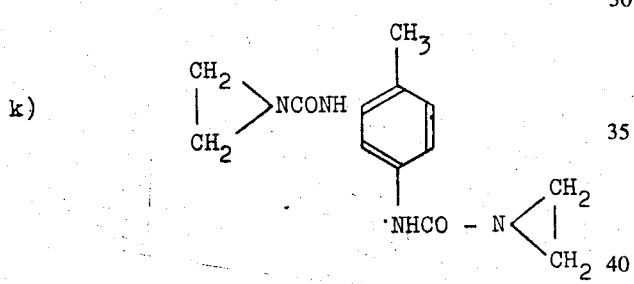
k) 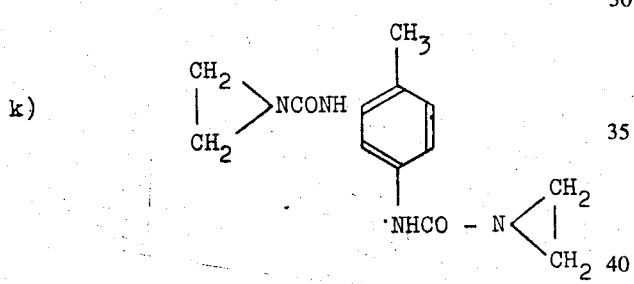
9. A heat-sensitive recording sheet which comprises a support and, coated thereon, the aqueous dispersion composition defined in claim 2.
10. A recording sheet according to claim 9, wherein the hardener is selected from the group consisting of
a) 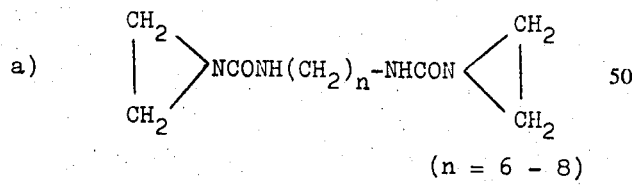
(n = 6 – 8)
e) 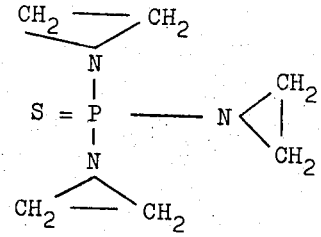
f) 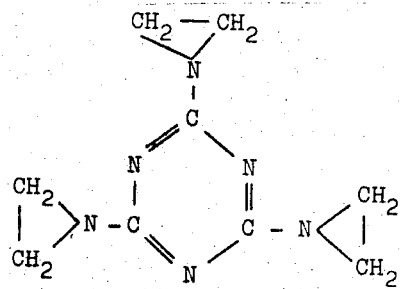
g) 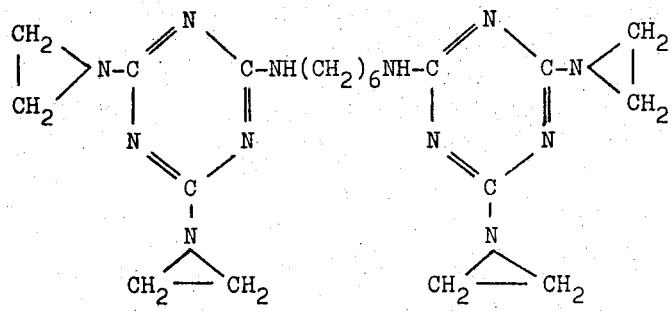

h) 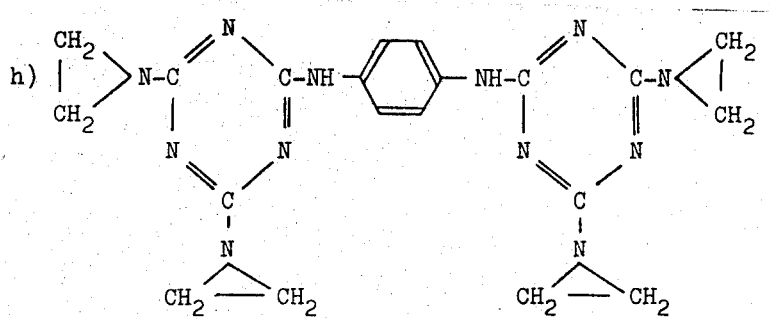
j) 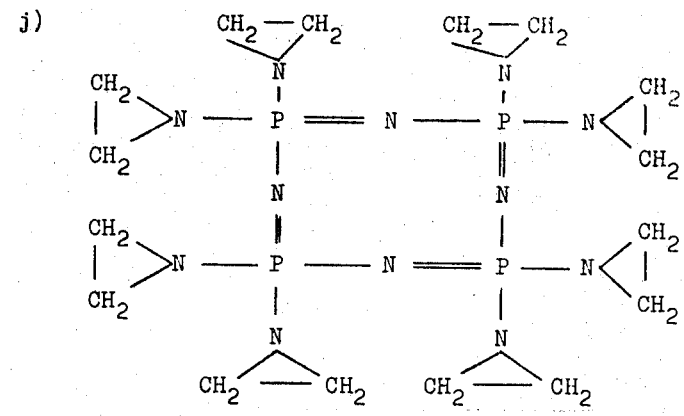
i) 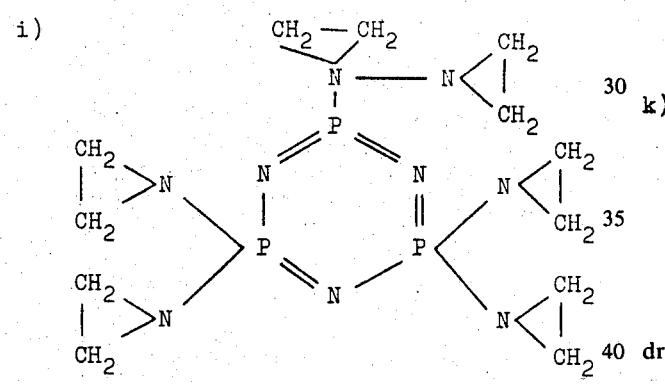
k) 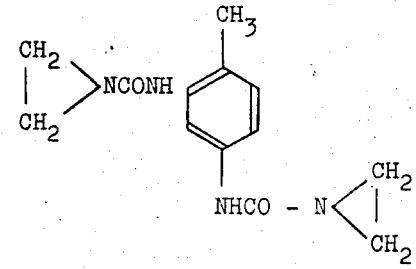
11. A dry heat-sensitive recording sheet prepared by drying the sheet of claim 9.
* * * * *